UNITED STATES PATENT OFFICE.

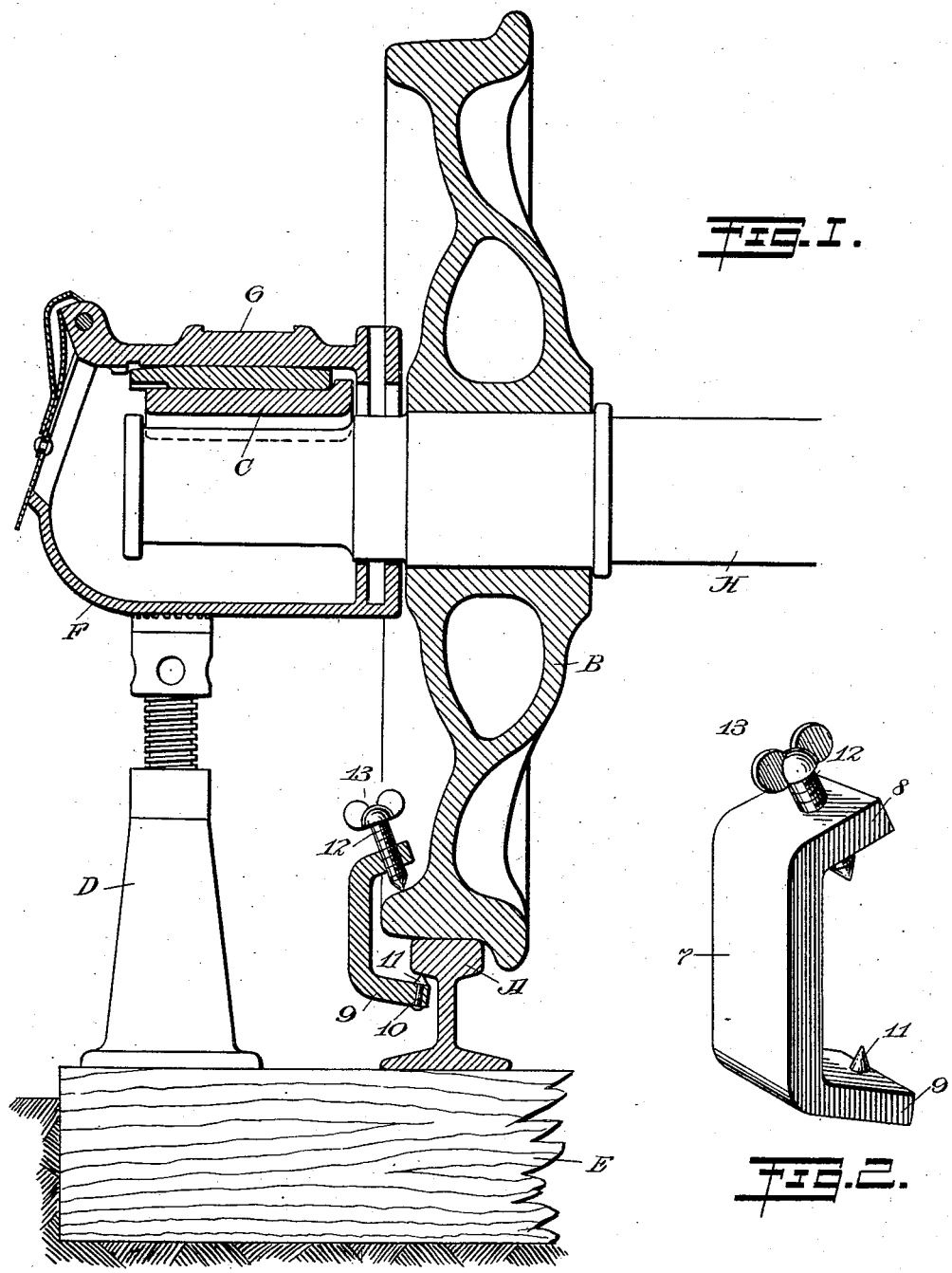

WILLIAM EDGAR IRONS, OF WILSONCREEK, WASHINGTON.

CAR-WHEEL CLAMP.

1,016,154.      Specification of Letters Patent.      Patented Jan. 30, 1912.

Application filed March 1, 1911. Serial No. 611,620.

*To all whom it may concern:*

Be it known that I, WILLIAM E. IRONS, a citizen of the United States, and a resident of Wilsoncreek, in the county of Grant and State of Washington, have invented a new and Improved Car-Wheel Clamp, of which the following is a full, clear, and exact description.

Among the principal objects which the present invention has in view are: to provide means for holding to the railway track the car carrying wheels while jacking the journal boxes to replace the brasses therein; and to provide a device of the character mentioned, simple and efficient in construction and operation, and adapted to be quickly and readily handled.

One embodiment of the present invention is disclosed in the structure illustrated in the accompanying drawings, in which like characters of reference denote corresponding parts in both the views, and in which—

Figure 1 is a vertical cross section of a usual car carrying wheel axle and journal box therefor, showing in conjunction therewith a clamp constructed and arranged in accordance with the present invention; and Fig. 2 is a perspective view in detail, on an enlarged scale, of a clamp constructed and arranged in accordance with the present invention.

As shown in the accompanying drawings, the clamp is provided with a body portion 7 of any desired length. From the body portion are extended the bracket ends 8 and 9. The pitch of the angles of the ends 8 and 9 with the body portion 7 may be varied to suit. The body portion 7 and ends 8 and 9 are constructed from bar metal to suitable width and gage. The bracket end 9 adjacent the forward edge thereof is bored to receive the shank 10 of a spur 11. The spur 11 is suitably sharpened and hardened to indent the under surface of the head of the railway track A. To this action the spur is compelled by a screw 12. The screw 12 is extended through a threaded perforation formed in the bracket end 8, and is pitched to any suitable angle inclined outwardly from the face of the wheel B, over the inner and upper side of the tread flange whereof the said end 8 and screw 12 extend. The screw 12 is provided with an ordinary wrench head 13.

The operation of the invention is as follows: It becomes necessary to remove the brasses C. A screw jack D is placed upon the tie E and under the box F. It will be remembered that the equalizing bars of the car truck rest in the saddle G of the box F, and that by raising the box F the car supporting structure of the truck is lifted from the axle H. If the wheel B be not restrained the axle H and wheel B would lift with the box F and thereby prevent the removal of the damaged brasses C. It is to prevent the lifting of the wheel B that the clamp constructed as herein shown and described is employed. The operator retracts the screw 12 until the bracket ends 8 and 9 are insertible over the head of the rail A and the tread flange of the wheel B, as shown best in Fig. 1 of the drawings. In this position the spur 11 being held firmly in position under the outer extension of the head A, the screw 13 is manipulated until the pointed end thereof bites into the metal of the tread of the wheel. The setting up of the screw is continued until both the sharpened end of the said screw and the spur 11 bite into the upper surface of the felly of the wheel and in the under surface of the head of the rail. In this position the clamp is held rigidly in position to avoid dislodgment, and holds firmly the wheel B in its position on the track A.

Having thus described my invention, what I claim as new and desire to secure by Letters Patent is:—

1. A car wheel clamp, comprising a U-shaped body the sides whereof are flared; a pricking spur mounted in the end of one of said sides; and a set screw extended through the end of the other of said sides and disposed perpendicular to said side, said screw having a pricking point at the end thereof.

2. A car wheel clamp, comprising a U-shaped body portion having a short and a long side disposed at an angle each from the other; a pricking spur mounted in the end of said long side; and a set screw extended through and thread engaged with the short side, said set screw having a pricking point disposed at the end thereof.

3. In a car wheel clamp, a body portion having flared extensions to rest beneath the head of a railway rail and above the flange of the tread of a railway car wheel; and pricking points mounted adjacent the ends of said extensions disposed each perpendicularly to the extension in which it is mounted and at an angle to the opposite extension whereby a clamp is formed which may be driven laterally into gripping relation with the railway rail and car wheel.

In testimony whereof I have signed my name to this specification in the presence of two subscribing witnesses.

WILLIAM EDGAR IRONS.

Witnesses:
T. B. SOUTHARD,
L. J. RONAYNE.

Copies of this patent may be obtained for five cents each, by addressing the "Commissioner of Patents, Washington, D. C."